UNITED STATES PATENT OFFICE.

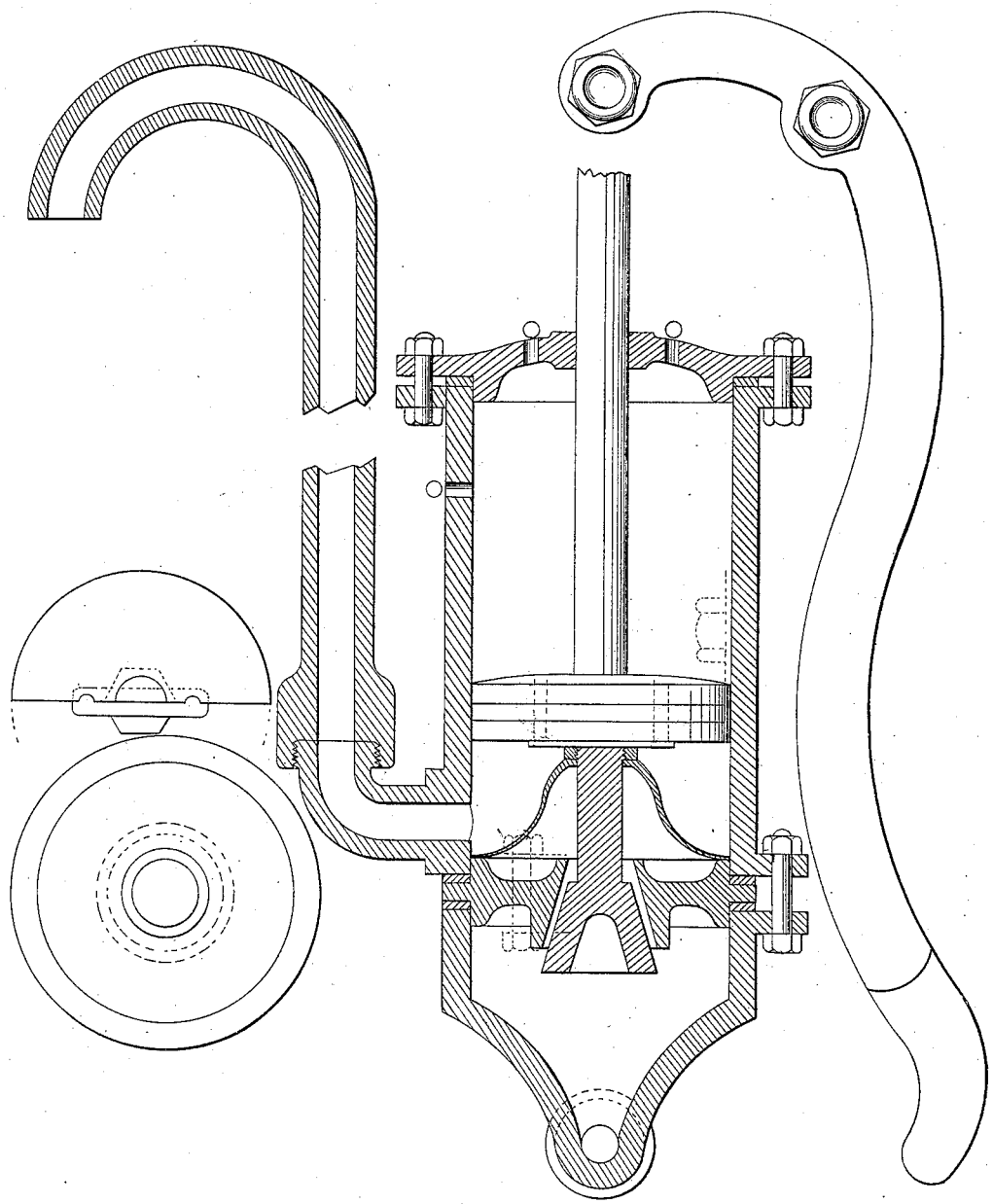

SAM. P. FRANCISCO AND WM. P. DICKINSON, OF READING, PENNSYLVANIA.

HYDRANT.

Specification of Letters Patent No. 22,357, dated December 21, 1858.

*To all whom it may concern:*

Be it known that we, SAMUEL P. FRANCISCO and WILLIAM P. DICKINSON, of Reading, in the county of Berks and State of Pennsylvania, have invented a new and useful Improvement in Hydrants and Fire-Plugs, by means of which the water, usually called "waste water," remaining in the delivery-pipe and cylinder after drawing is ejected and all danger of freezing prevented; and we do hereby declare that the following is a full and exact description thereof, reference being had to the accompanying drawing and to the letters of reference marked thereon.

The nature of our invention consists in providing a cylinder and piston, for the hydrant or fire-plug, with suitable openings in both—the openings in the piston being provided with valves on the underside. The air admitted through the openings in the cylinder is allowed—after water has been drawn—to flow into the cylinder under the piston, when the piston is raised by the operator, either through the piston openings or the orifice at the side of cylinder, and the operator, by the downward motion of the piston—which thus compresses the air—is enabled to eject the water remaining in the cylinder and delivery pipe—(which also answers as a waste-pipe)—thus preventing any danger from freezing by allowing no water to remain in the cylinder or delivery pipe.

Now the drawing Figure 1, represents a longitudinal sectional view of the whole arrangement. Fig. 2, a transverse section of the under part of the piston with the valve thereon, which is of flexible material so as readily to open by atmospheric pressure with the upward motion of the piston, and close as readily when pressed downward, thus preventing the escape of the air which is necessary to eject the water. Fig. 3, is a top view of the valve seat. Fig. 4, is a section of the same through which the water flows into the cylinder. Fig. 5, is the valve, represented as open in the drawing, allowing the water to flow into the cylinder from C, where it enters. Fig. 6, is the bottom of the cylinder. Fig. 7, is the delivery (or waste water) pipe. Fig. 8, is a spring to keep the valve in its place. Fig. 9 is the piston with apertures at B, B. Fig. 10, is the cylinder cap, with apertures for admitting the air, marked A, A.

Now it is obvious that if the piston Fig. 9, be raised—the valve Fig. 5, by means of the under pressure of the water and spring will close—then after the piston is raised above the level of the water in the cylinder, the air will flow in through the piston openings at B, B, the same being supplied at $a, a$, as also at H, which latter opening (being at the side of the cylinder and low enough to admit the outside air under the piston when the same is raised to the top of the cylinder) is intended to secure the regular working of the piston, in case the valve at the piston openings should get out of order. When the piston is raised above the aperture at H, the air rushing in under the piston will fill the cylinder above the water; then by the downward motion of the piston, the force of the condensed air will eject (all or) nearly all the remaining water from the cylinder and delivery pipe, and if the outlet of the cylinder at D, be on a level with or slightly below (instead of being above as represented in the drawing) the surface of the valve-seat, which constitutes the bottom of the cylinder—the water remaining in the cylinder will be entirely ejected, and to prevent the induction valve from being forced open, and a further supply of water being admitted into the cylinder by the descent of the piston, the hand lever of the piston is provided with a stop or catch, properly adjusted, so as to stop the piston in its descent, just before it comes in contact with the valve stem—the stop or catch being only used when it is desired to expel the water from the cylinder and delivery pipe—thereby effecting the object of the invention.

We do not claim the application and use of a piston and cylinder in connection with a hydrant or fire-plug, nor do we confine ourselves to the precise details hereinbefore set forth, so long as the peculiar character of our invention is retained, as the same may be varied. But

What we claim and desire to secure by Letters Patent is—

The providing said cylinder and piston with suitable openings for the admission of the air and for the purposes set forth.

SAMUEL P. FRANCISCO.
W. P. DICKINSON.

Witnesses:
GEORGE PRINTZ,
DANIEL DICKINSON.